(12) United States Patent
Munari

(10) Patent No.: US 7,841,486 B2
(45) Date of Patent: Nov. 30, 2010

(54) DEVICE FOR FASTENING A CONNECTING MEMBER TO A HANDLE OF A COOKING VESSEL

(75) Inventor: Marco Munari, Cardano Al Campo (IT)

(73) Assignee: LA Termoplastic F.B.M. - S.R.L., Arsago Seprio (IT)

( * ) Notice: Subject to any disclaimer, the term of this patent is extended or adjusted under 35 U.S.C. 154(b) by 612 days.

(21) Appl. No.: 11/493,039

(22) Filed: Jul. 26, 2006

(65) Prior Publication Data

US 2007/0201944 A1     Aug. 30, 2007

(30) Foreign Application Priority Data

Jul. 29, 2005    (EP)    .................. 05425562

(51) Int. Cl.
*B65D 25/32* (2006.01)
(52) U.S. Cl. ...................................... 220/776; 220/752
(58) Field of Classification Search .................. 220/759, 220/776, 752, 753, 757, 769, 770, 775; 403/109.1, 403/297, 6, 326, 329; 15/145; 16/422
See application file for complete search history.

(56) References Cited

U.S. PATENT DOCUMENTS 2,501,940 A  *  3/1950  Hibbard ........................ 16/425
2,712,950 A  *  7/1955  Siebert ........................... 285/7
5,560,081 A  *  10/1996  Yen .............................. 220/776

FOREIGN PATENT DOCUMENTS

| GB | 178 028 A | 4/1922 |
| GB | 2 105 576 A | 3/1983 |
| GB | 2 118 431 A | 11/1983 |

* cited by examiner

*Primary Examiner*—Anthony Stashick
*Assistant Examiner*—Jeffrey Allen
(74) *Attorney, Agent, or Firm*—Berenato & White, LLC

(57) ABSTRACT

There is provided a device for fastening a connecting member to a handle of a cooking vessel; the connecting member has a collar portion having an inner cavity into which a connecting portion of the handle is inserted; the collar portion is bounded by a lateral wall closed into a loop by means of two opposite end tabs joined to each other and defining at least one preassembly tooth cooperating with a seat formed in the connecting portion; and the connecting member has a fastening member, which is pressed and permanently deformed inside a recess on the connecting portion to secure the connecting portion inside the cavity.

14 Claims, 3 Drawing Sheets

DEVICE FOR FASTENING A CONNECTING MEMBER TO A HANDLE OF A COOKING VESSEL

The present invention relates to a device for fastening a connecting member to a handle of a cooking vessel.

BACKGROUND OF THE INVENTION

Cooking vessel handles, particularly those made of heat-setting resin such as bakelite, are known to be connected to the cooking vessel by means of a metal connecting member, which is fixed to the handle and then connected to the cooking vessel by means of screws or rivets.

Various devices for fastening the connecting member to the handle are known.

One known connecting member, for example, has a flanged portion for connection to the cooking vessel; and an open-section collar portion fitted onto a connecting portion of the handle, and having two side by side end edges bent inside respective slits formed in a top face of the connecting portion of the handle. Underneath, the connecting portion has a recess into which a fastening member, in particular a blade cut into the lateral wall of the collar portion, is pressed and permanently deformed.

This and other similar solutions have the drawback of producing a handle in which the collar portion of the connecting member is interrupted (open) and therefore unsightly. Neither is this type of solution fully satisfactory in terms of fast, easy assembly.

SUMMARY OF THE INVENTION

It is an object of the present invention to provide a device for fastening a connecting member to a handle of a cooking vessel, designed to eliminate the aforementioned drawbacks of the known art. More specifically, it is an object of the invention to provide a device which is easy, fast, and cheap to produce and assemble, while at the same time being fully efficient.

According to the present invention, there is provided a device for fastening a connecting member to a handle of a cooking vessel, as defined in the attached Claims.

The device according to the invention provides for efficient, safe, reliable fastening of the connecting member to the handle. The fastening operation itself is also fast, easy and inexpensive, particularly on account of the connecting member being fittable beforehand to the connecting portion of the handle by means of the preassembly tooth, and so being secured to the handle even before it is fully fastened by pressing a permanently deformable fastening member. Moreover, the resulting handle has a connecting member in the form of a highly attractive continuous, closed band.

The invention also relates to a connecting member for connecting a handle to a cooking vessel, and to a cooking vessel handle assembly, as defined in the attached Claims.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figure 1:
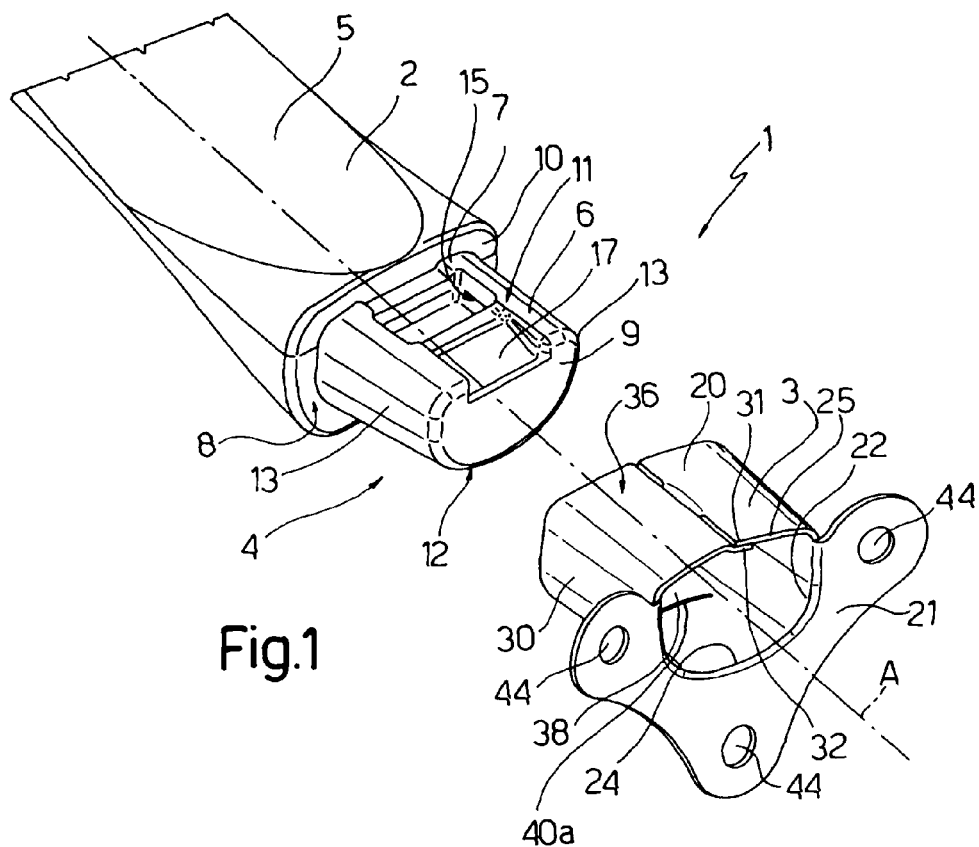
FIG. 1 shows an exploded view in perspective of a cooking vessel handle assembly comprising a handle and a connecting member, and having a device for fastening the connecting member to the handle in accordance with the invention.
Figure 2:
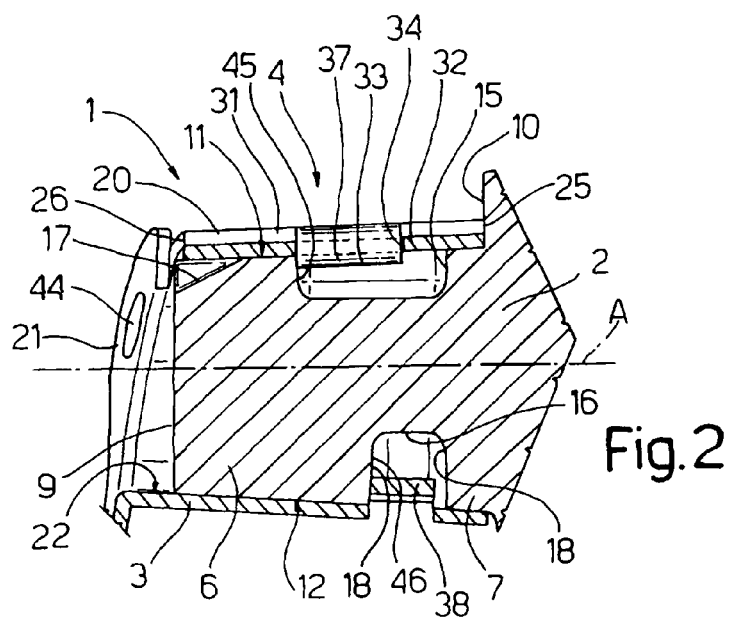
FIG. 2 shows a larger-scale section of a detail of the FIG. 1 handle assembly as assembled.
Figure 3:
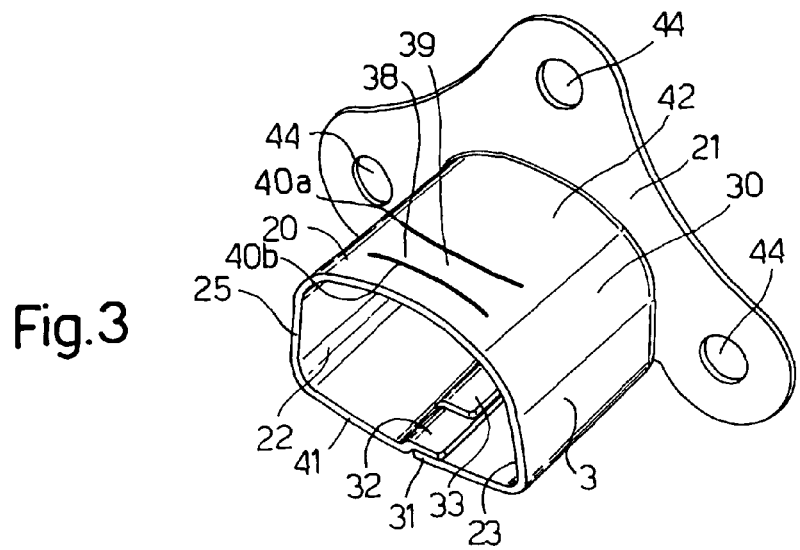
FIG. 3 shows an underside view in perspective of the connecting member forming part of the FIG. 1 handle assembly.
Figure 4:
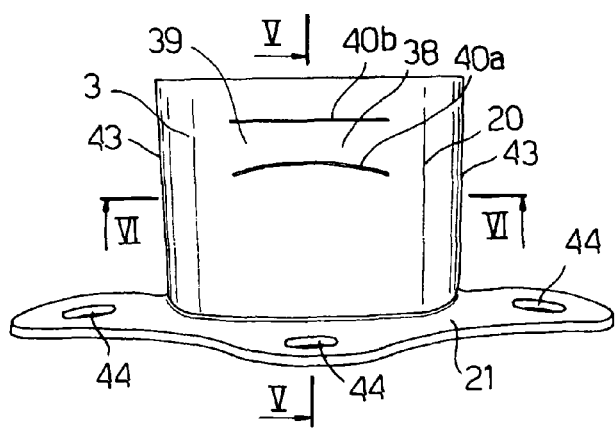
FIG. 4 shows an underside plan view of the FIG. 3 connecting member.
Figure 5:
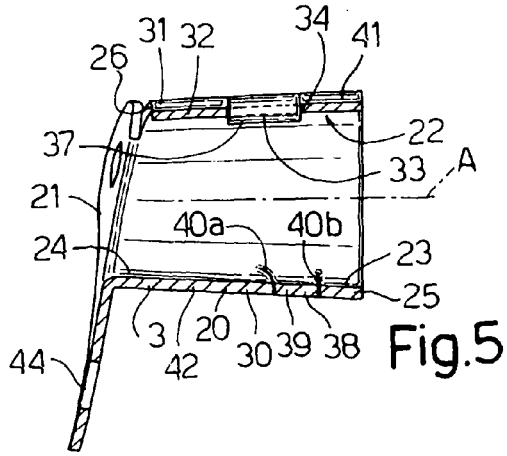
FIGS. 5 and 6 show sections along lines V-V and VI-VI in FIG. 4 respectively.
Figure 6:
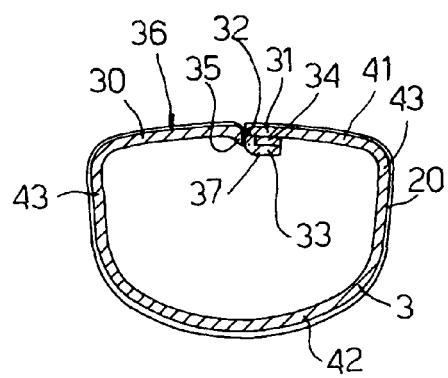

With reference to FIGS. 1 and 2, a handle assembly 1 of a known cooking vessel (e.g. a frying pan, not shown) comprises a handle 2, a connecting member 3 for connection to the cooking vessel, and a fastening device 4 for fastening connecting member 3 to handle 2. The connecting member 3 comprises a collar portion 20 having an axis A and a flange portion 21.

Handle 2 comprises a grip portion 5, of any shape, designed to be gripped in use by a user (the example shown referring to a frying pan handle, a substantially elongated grip portion is shown); and a connecting portion 6 projecting from one end of grip portion 5 along an coaxially with the axis A. Handle 2 is made, for example, of heat-setting resin (such as bakelite) or other suitable material.

Connecting portion 6 has a root end 7 located centrally on a front surface 8 of grip portion 5; and a free end 9 opposite root end 7. Handle 2 has an axial shoulder 10 facing connecting portion 6 and defined by a radially outer annular edge about root end 7 on front surface 8.

Connecting portion 6 tapers along axis A towards free end 9, i.e. decreases in cross section from root end 7 to free end 9.

Connecting portion 6 is substantially prismatic with rounded sides and/or edges. More specifically, connecting portion 6 comprises two opposite faces 11, 12 connected by two sides 13, and both faces 11, 12 and sides 13 converge towards free end 9. Faces 11, 12 have, respectively, a seat 15 and a diametrically opposite recess 16, both formed in connecting portion 6; seat 15 has a lead-in 17 facing free end 9; and recess 16 is bounded by two facing walls 18 crosswise to axis A.

With reference also to FIGS. 3 to 6, collar portion 20 extends along axis A, and has an open through inner cavity 22 extending along axis A and having two axially opposite openings 23, 24 bounded by respective end edges 25, 26.

Collar portion 20 tapers along axis A, i.e. has an inner cross section decreasing along axis A, in particular from end edge 25 to end edge 26. Cavity 22 is the same shape as connecting portion 6, which is inserted inside cavity 22. Collar portion 20 is fitted onto connecting portion 6, preferably with a small amount of interference, so that end edge 25 rests against shoulder 10.

Connecting member 3 is slightly flexible radially, and is preferably made of metal. More specifically, connecting member 3 is a one-piece member cut from sheet metal and bent into shape.

Collar portion 20 has a lateral wall 30 defining cavity 22 and itself defined by a band bent into shape and having two opposite end tabs 31, 32; lateral wall 30 is looped to define cavity 22, and the two tabs 31, 32 are joined to each other. In the non-limiting example shown, tabs 31, 32 are joined by a fastener 33 carried by tab 31, and which engages a slit formed in tab 32. Tab 32 is bent inside cavity 22 to form a step 35 having slit 34; and tab 31, supporting fastener 33, is superimposed on tab 32 at step 35, so as to be substantially flush with an outer surface 36 of lateral wall 30. Fastener 33 projects inwards from lateral wall 30 into cavity 22 to define a preassembly tooth 37 engaging seat 15 obviously, tabs 31, 32 may be joined otherwise than as described herein, e.g. by bending, shaping and welding, overlapping, seaming or clinching; and preassembly tooth 37 may be formed otherwise than as described and illustrated herein by way of example, e.g. may be applied and welded to tabs 31, 32.

The connecting member 3 also comprises a permanently deformable, press-in fastening member 38. More specifically, the fastening member 38 is defined by a sector 39 of the lateral wall 30 bounded by one or more slits 40 formed through the lateral wall 30 so as to extend on the outer surface 36 thereof crosswise to the axis A and along and in the direction of a curve of the outer surface 36. In the non-limiting example shown in FIGS. 3 to 5, sector 39 is bounded by two substantially parallel slits 40a, 40b extending crosswise to the axis A.

According to one aspect of the invention the slit 40a closer to end edge 26 and flange portion 21 is curved along axis A, with its concavity facing end edge 26 and flange portion 21, and therefore facing a connecting end by which connecting member 3 is connected to the cooking vessel.

In the example shown, lateral wall 30 has two opposite sides 41, 42 connected by two sides 43, and both sides 41, 42 and sides 43 converge from end edge 25 towards end edge 26.

Preassembly tooth 37, defined by fastener 33, is located on side 41 to engage seat 15, and fastening member 38 is located on side 42 to engage recess 16.

Flange portion 21 projects radially outwards from end edge 26, and has holes 44 for connection (e.g. by rivets) to the cooking vessel.

To assemble handle assembly 1, connecting member 3 is fitted onto connecting portion 6 of handle 2 along axis A, so that end edge 25 rests against shoulder 10; given the elasticity of connecting member 3 and the presence of lead-in 17, preassembly tooth 37 therefore clicks inside seat 15, and cooperates with and rests against a retaining surface 45 of seat 15 facing end edge 25 and therefore opposite shoulder 10.

Connecting member 3 is thus preassembled and secured firmly to handle 2, by preassembly tooth 37 engaging seat 15, and also by virtue of the taper of connecting portion 6 and collar portion 20, but can still be removed. Connecting member 3 is connected permanently to handle 2 by pressing and permanently deforming fastening member 38 inside recess 16. Fastening member 38 penetrates recess 16 and cooperates with and rests against a retaining surface 46 formed on the wall 18 of recess 16 facing end edge 25 and therefore opposite shoulder 10, so that connecting member 3 is locked axially between shoulder 10 and retaining surfaces 45, 46.

Given the curved shape of slit 40a, the end points of curved slit 40a of fastening member 38 exert thrust on retaining surface 46 to press end edge 25 against shoulder 10 of the handle and so compensate for any slack.

Figure 7:
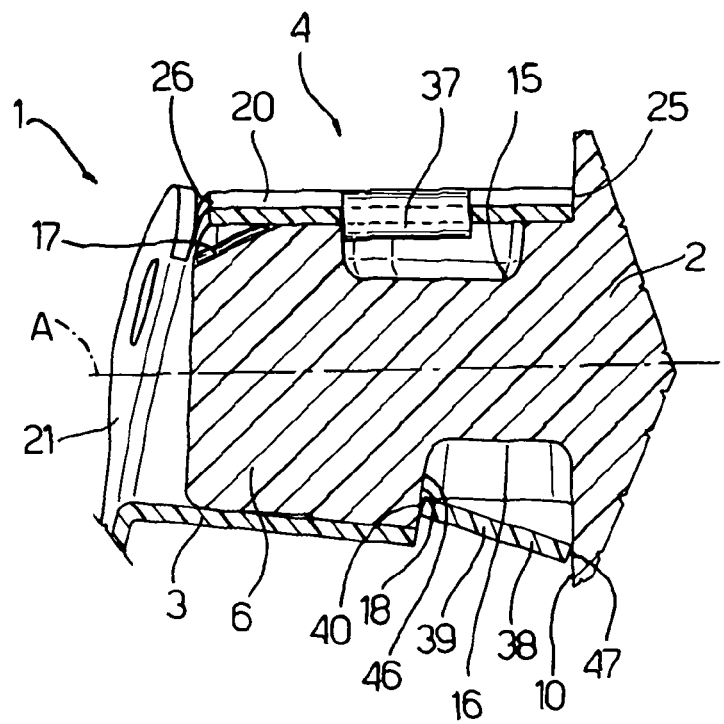
FIG. 7 shows a section of an alternative embodiment of the handle assembly according to the invention.
Figure 8:
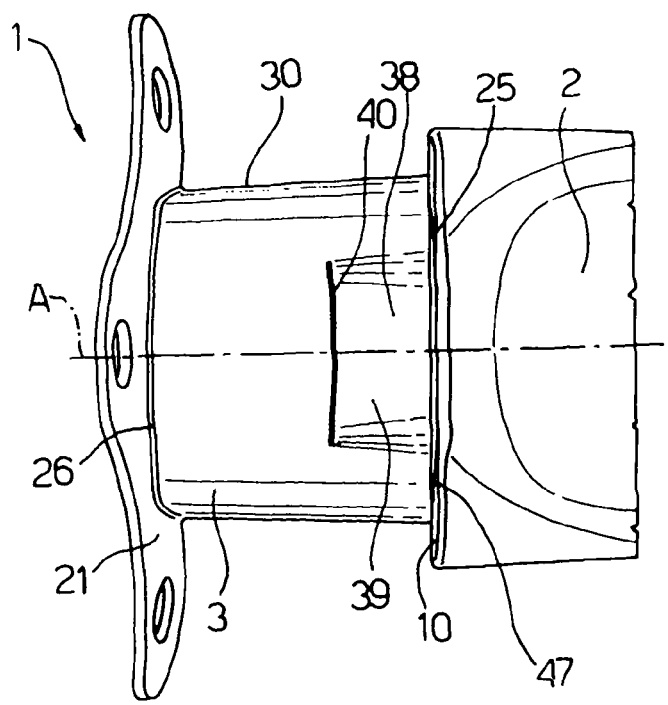
FIG. 8 shows an underside plan view of a connecting member forming part of the FIG. 7 handle assembly.

In the FIGS. 7 and 8 variation, in which details similar or identical to those already described are indicated using the same reference numbers, lateral wall 30 has only one slit 40 defining sector 39 defining fastening member 38. Sector 39 is therefore bounded by slit 40 and by a portion 47 of end edge 25; slit 40 is curved along axis A, with its concavity facing end edge 26 and flange portion 21, and therefore facing a connecting end by which connecting member 3 is connected to the cooking vessel; and recess 16 is bounded by a front wall 18 and at the rear by shoulder 10.

In this case too, when sector 39 is pressed into recess 16, the end points of curved slit 40 of fastening member 38 exert thrust on the retaining surface 46 formed on wall 18 of recess 16, and so push portion 47 so that it cooperates with and rests against shoulder 10.

Clearly, changes may be made to what is described and illustrated herein without, however, departing from the scope of the accompanying Claims.

The invention claimed is:

1. A device (4) for fastening a connecting member (3) to a handle (2) of a cooking vessel, the device comprising:
   a connecting member (3) having a collar portion (20) having an axis (A) and defining an inner cavity (22) extending along the axis (A); and
   a connecting portion (6) of the handle (2), inserted inside the cavity (22) along the axis (A);
   the collar portion (20) being bounded by a lateral wall (30) closed into a loop by means of two opposite end tabs (31, 32) joined to each other and defining at least one preassembly tooth (37) projecting radially from the tabs (31, 32) into the cavity (22) to cooperate with a seat (15) formed in the connecting portion (6), the loop extending along the axis (A) and having axially opposite openings coaxially oriented along the axis (A);
   the connecting member (3) fitted onto connecting portion (6) so that an end edge (25) of the collar portion (20) substantially perpendicular to the axis (A) rests against an axial shoulder (10) of the handle (2);
   the preassembly tooth (37) inserted inside the seat (15) to cooperate with and rest against a retaining surface (45) of the seat (15), the retaining surface (45) disposed opposite the shoulder (10) and extending substantially perpendicularly to the axis (A) so as to face the end edge (25);
   the lateral wall (30) of the connecting member (3) comprising at least one slit (40) extending along and in the direction of a curve of an outer surface (36) of the lateral wall (30) of the collar portion (20) and crosswise to the axis (A) on the outer surface (36) and defining a sector (39) of the connecting member (3), in turn defining a press-in fastening member (38) for securing the connecting portion inside the cavity;
   the fastening member (38) bounded by at least one slit (40) being pressed and deformed permanently inside a recess (16) formed on the connecting portion (6);
   the preassembly tooth (37) and the fastening member (38) being located on opposite sides (41, 42) of the collar portion (20) of the connecting member (3), and the seat (15) and the recess (16) being located on respective opposite faces (11, 12) of the connecting portion (6).

2. The device as claimed in claim 1, wherein the preassembly tooth (37) clicks into the seat (15).

3. The device as claimed in claim 1, wherein the seat (15) comprises a lead-in (17) to assist insertion of the preassembly tooth (37) into the seat (15).

4. The device as claimed in claim 1, wherein the slit (40) is curved along the axis (A).

5. The device as claimed in claim 4, wherein the concavity of the slit (40) faces a connecting end by which the connecting member (3) is connected to the cooking vessel.

6. The device as claimed in claim 1, wherein the sector (39) is bounded by the slit (40) and by a portion (47) of an end edge (25) of the connecting member (3) cooperating with a shoulder (10) of the handle.

7. The device as claimed in claim 1, wherein the sector (39) is bounded by two slits (40) formed through the lateral wall (30), and wherein one of the slits (40) is disposed closer to the end edge (25) of the collar portion (20) than another of the slits (40).

8. The device as claimed in claim 1, wherein the collar portion (20) extends along the axis (A) and tapers along the axis (A).

9. The device as claimed in claim 1, wherein the connecting portion (6) tapers towards a respective free end (9).

10. A device (4) for fastening a connecting member (3) to a handle (2) of a cooking vessel, the device comprising:
   a connecting member (3) having a collar portion (20) having an axis (A) and defining an inner cavity (22); and
   a connecting portion (6) of the handle (2), inserted inside the cavity (22) along an axis (A);
   the collar portion (20) being bounded by a lateral wall (30) closed into a loop by means of two opposite end tabs (31, 32) joined to each other and defining at least one preassembly tooth (37), which projects radially from the tabs (31, 32) into the cavity (22);
   the connecting portion (6) comprises two opposite faces (11, 12) having, respectively, a seat (15) and a diametrically opposite recess (16), both formed in the connecting portion (6);
   the seat (15) having a retaining surface (45) extending substantially perpendicularly to the axis (A);
   the connecting member (3) also comprises a permanently deformable, press-in fastening member (38) for securing the connecting portion inside the cavity, defined by a sector (39) of the lateral wall (30) bounded by one or more slits (40) formed through lateral wall (30) so as to extend along and in the direction of a curve of an outer surface (36) of the lateral wall (30) of the collar portion (20) and crosswise to the axis (A);
   the preassembly tooth (37) and the fastening member (38) being located on opposite sides (41, 42) of the collar portion (20) to engage the seat (15) and the recess (16) respectively;
   the preassembly tooth (37) inside the seat (15) cooperating with and resting axially against the retaining surface (45) of the seat (15).

11. A device (4) for fastening a connecting member (3) to a handle (2) of a cooking vessel, the device comprising:
   a connecting member (3) having a collar portion (20) having an axis (A) and defining an inner cavity (22); and
   a connecting portion (6) of the handle (2), inserted inside the cavity (22) along an axis (A);
   the collar portion (20) being bounded by a lateral wall (30) closed into a loop by means of two opposite end tabs (31, 32) joined to each other and defining at least one preassembly tooth (37), which projects radially from the tabs (31, 32) into the cavity (22);
   the connecting portion (6) comprises two opposite faces (11, 12) having, respectively, a seat (15) and a diametrically opposite recess (16), both formed in the connecting portion (6);
   the seat (15) having a lead-in (17) facing a free end (9) of the connecting portion (6);
   the recess (16) being bounded by two facing walls (18) crosswise to axis A; the preassembly tooth (37) is inserted inside the seat (15), and cooperates with and rests against a retaining surface (45) of the seat (15) facing an end edge (25) of the collar portion (20) and disposed opposite an axial shoulder (10) of the handle (2) facing the connecting portion (6), to preassemble the connecting member (3) onto the connecting portion (6) of the handle (2);
   the retaining surface (45) extending substantially perpendicularly to the axis (A) so as to face the end edge (25);
   the connecting member (3) also comprising a permanently deformable, press-in fastening member (38) for securing the connecting portion inside the cavity, defined by a sector (39) of the lateral wall (30) bounded by one or more slits (40) formed through lateral wall (30) so as to extend along and in the direction of a curve of an outer surface (36) of the lateral wall (30) of the collar portion (20) and crosswise to the axis (A);
   the press-in fastening member (38) being permanently deformed to engage the recess (16) and permanently secure the connecting member (3) to the connecting portion (6) of the handle (2).

12. The device as claimed in claim 11, wherein the connecting portion (6) tapers along the axis A towards the free end (9) thereof, and has a cross section that decreases from a root end (7) to the free end (9) of the connecting portion (6), and wherein the collar portion (20) tapers along the axis (A) and has an inner cross section decreasing along the axis (A) from an end edge (25) to an axially opposite end edge (26).

13. The device as claimed in claim 1, wherein the connecting portion (6) tapers along the axis A towards a free end (9) thereof, and has a cross section that decreases from a root end (7) to the free end (9) of the connecting portion (6), and wherein the collar portion (20) tapers along the axis (A) and has an inner cross section decreasing along the axis (A) from an end edge (25) to an axially opposite end edge (26).

14. The device as claimed in claim 10, wherein the connecting portion (6) tapers along the axis A towards a free end (9) thereof, and has a cross section that decreases from a root end (7) to the free end (9) of the connecting portion (6), and wherein the collar portion (20) tapers along the axis (A) and has an inner cross section decreasing along the axis (A) from an end edge (25) to an axially opposite end edge (26).

* * * * *